United States Patent [19]

Herrnring

[11] 4,139,424
[45] Feb. 13, 1979

[54] SOCKET STRUCTURE FOR THE BALL OF A BALL POINT PEN REFILL

[75] Inventor: Heinz G. Herrnring, Alveslohe, Fed. Rep. of Germany

[73] Assignee: Montblanc-Simplo GmbH, Hamburg, Fed. Rep. of Germany

[21] Appl. No.: 809,941

[22] Filed: Jun. 24, 1977

Related U.S. Application Data

[60] Division of Ser. No. 662,940, Mar. 1, 1976, Pat. No. 4,061,430, Continuation-in-part of Ser. No. 456,860, Apr. 1, 1974, abandoned, which is a continuation-in-part of Ser. No. 366,855, Jun. 4, 1973, Pat. No. 3,837,750.

[30] Foreign Application Priority Data

Jun. 2, 1972 [DE] Fed. Rep. of Germany ....... 2226902

[51] Int. Cl.² .......................... C25D 7/04; C25D 5/50
[52] U.S. Cl. .................................. 204/26; 204/37 R; 204/40
[58] Field of Search ................ 204/15, 16, 26, 37 R, 204/DIG. 9; 401/216

[56] References Cited

U.S. PATENT DOCUMENTS

| | | | |
|---|---|---|---|
| 2,678,909 | 5/1954 | Jernstedt | 204/DIG. 9 |
| 2,696,466 | 12/1954 | Beaver, Jr. | 204/26 X |
| 2,771,409 | 11/1956 | Cross | 204/35 |
| 3,551,302 | 12/1970 | Woods et al. | 204/32 |
| 3,666,636 | 5/1972 | Tomaszewski | 204/16 |

FOREIGN PATENT DOCUMENTS 849432  8/1966  United Kingdom ................. 401/216

Primary Examiner—John H. Mack
Assistant Examiner—William Leader
Attorney, Agent, or Firm—Walter Becker

[57] ABSTRACT

A method of making a socket structure for a ball point refill, which comprises a ball made of corundum and arranged inside an outer supporting shell provided in its interior with a compound bearing consisting of a backing shell having a hardness exceeding 800 kg/sq. mm Vickers and an inner lining facing the ball and having a hardness of less than 200 kg/sq. mm Vickers.

5 Claims, 3 Drawing Figures

SOCKET STRUCTURE FOR THE BALL OF A BALL POINT PEN REFILL

This is a divisional application based on Ser. No. 662,940-Herrnring filed Mar. 1, 1976, now U.S. Pat. No. 4,061,430-Herrnring issued December 1977 as a continuation-in-part application of my copending application Ser. No. 456,806 filed Apr. 1, 1974 now abandoned, which in turn is a continuation-in-part of my parent application Ser. No. 366,855 filed June 4, 1973 (Monday), now U.S. Pat. No. 3,837,750 issued Sept. 24, 1974.

This patent concerns a socket structure for a ball point refill, which comprises a ball made of corundum and arranged inside an outer supporting shell provided in its interior with a compound bearing consisting of a backing layer having a hardness exceeding 800 kg/sq. mm Vickers and an inner lining facing the ball and having a hardness of less than 200 kg/sq. mm Vickers.

It is an object of the present invention to provide a socket structure of the above mentioned general character but with considerably improved wearing properties and, therefore, greatly increased useful life.

It is another object of this invention to provide a method of making the socket structure set forth in the preceding paragraph.

These and other objects and advantages of the invention will appear more clearly from the following specification in connection with the accompanying drawings in which.

Figure 1:
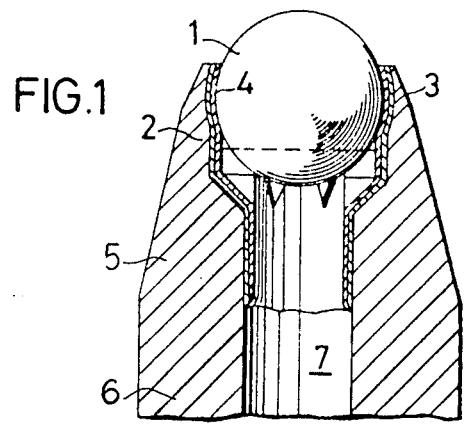
FIG. 1 illustrates a longitudinal section through a socket structure according to the invention of a ball point pen refill.

With the present-day state of the art there exists an object to find an economical solution for the manufacture of a ball-point which when in use provides a writing "touch" as pleasant as possible and which provides a uniform writing quality and great writing capability, for instance, 10,000 m.

In order to assure that the ball or sphere does not slide or slip over the paper thereby causing breaks in writing, the ball must have a rough-engaging upper surface. Such balls are capable of being produced e.g. from commercially available tungstencarbide or sapphire. Bearings with such balls do not fulfill the requirement for maintenance of size over the entire writing length because of the high wear resistance thereof. The rough surface of the ball, the dust and the paper-filling materials and poor or bad lubricating properties of the presently used ink or ink pastes require extremely high wear resistance of the bearing if the nominal bearing clearance is not increased by several microns. In such an instance, however, a satisfactory writing is no longer assured. For example, in such a bearing with a 0.7 mm ball, 4.5 million rotations under the unilateral writing pressure must be withstood without considerable wear due to the above mentioned conditions.

In order to bring about a production method that is as economical as possible for ball point writing instruments, especially as to the balls or points thereof, materials cannot be used which are too hard since this would cause a rapid wear of the adjacent lining.

If on the other hand the ball were produced by a pressing operation e.g. of brass with 63% Cu and 37% Zn the ball would undergo rapid wear. Thus, a compromise has to be found in this connection. In an endeavor to find a suitable compromise, it has been surprisingly found according to the invention that economically machinable materials can be used for the outer supporting shells (socket) in multi-layer bearings having high wear resistance. The inner layers of the multi-layer bearing facing the ball are applied by way of galvanic or chemical deposition, or separation, or precipitation.

According to the invention a modified, more economical manufacture of the ball points was found with a method of bulk material handling such as with drums, bells or the turbojet of Electroplating Engineers S.A., Chatelaine-Geneva; this means that the raw ball points to be plated are not taken up individually in frames in any way.

Extensive test series, first on a laboratory scale and then on a technical scale have been run to discover the most suitable successions and thicknesses of the different layers Unexpectedly there was found that an embedding of hard particles in a very soft intermediate layer resulted in extraordinarily good bearing properties. For this purpose, there was developed a silver bath and a copper bath containing boron carbide or silicon carbide as a dispersion phase. Conventional silver baths only permit incorporating a small amount of dispersed phase during the galvanic metal deposition or separation. By adding flotation-aiding means, for instance, non-ionized detergents and cationic soaps as Dodecyl-Triphenyl-Phosphonium bromide, the quantity to be incorporated can be increased. A concentration of the dispersed phase of 60–120 g/l has been found optimal. In this connection for a satisfactory deposition or separation of the dispersed phase and for avoiding the formation of undesired edges which could disturb the further treatment and could be disadvantageous for the writing properties, it is important to use alternating positive and negative impulses. Tests on technical scales led to the development of a special galvanizing drum shown in FIG. 3. In this drum the dispersed phase is always uniformly distributed. The most advantageous particle size for the dispersed phase has been found to be about 1–5 microns in diameter. The most advantageous layer thickness for the layer containing the dispersed phase is about 5–15 microns. A concentration of the dispersed material in the silver or copper layer amount to 10–30 volume percent was found to be the most advantageous content. Lower contents rapidly reduce the effectiveness, and with higher contents the layers tend to disintegrate during subsequent working or treatment.

The socket structure according to the present invention is characterized primarily in that a backing bearing layer 3 within said socket 2 comprises a substance selected from the group consisting of chromium, nickel, and an alloy containing at least one of the metals chromium, nickel, silver, and copper, said alloy having dispersed therein a carbide compound with a hardness exceeding 600 kg/sq. mm Vickers. Inside said backing bearing layer 3 and firmly connected thereto is an inner lining 4 which has a hardness of less than 200 kg/sq. mm Vickers and which slidably engages the ball of the ball pen.

The method according to the present invention for making the above mentioned socket structure and treating the refill composed of the supporting shell, the backing layer, and said inner lining includes the steps of: electrolytically treating said socket structure in a silver bath with a carbide dispersed therein and at a cathodic current density of 4–8 Amp/dm$^2$ and subsequently at an anodic current density of from 2 to 6 Amp/dm$^2$ and subjecting the thus treated socket structure to a heat treatment at a temperature within the range of from 200° C. to 500° C. for a period of from 20 minutes to 3 hours.

In connection with this treatment it will be appreciated that, in view of the continuous pole change, with the cathodic current metal is deposited and that with the anodic current metal is again received and returned to the electrolyte. This alternate deposit and removal serves to equalize the galvanicly deposited layers. The finally obtained deposit thus depends in addition to the specific bath composition on (a) the cathodic depositing time, i.e. the total of the cathodic pulse time periods multiplied by the employed current density minus (b) the anodic treatment time, i.e. the total of the anodic pulse time periods multiplied by the employed current density. Thus, a deposit is obtained only when (b) is less than (a) or the total of (b) is less than the total of (a). It may furthermore be stated that the treatment is carried out until the deposited layer has reached a thickness of from 5 to 50 microns. If, e.g., the difference (a) − (b) is rather small, the treatment lasts rather long, and if the difference (a) − (b) is relatively great, the treatment time is correspondingly short.

Referring now to the drawing in detail, the socket according to the invention for a ball point pen refill 7 comprises substantially an outer supporting shell 2, a backing bearing layer 3 and an inner lining layer 4 secured in a tapered end 5 of a pen body 6. The shell 2 together with the linings 3 and 4 form the bearing for the ball 1. The material used for the inner lining 4 should have a hardness of less than 200 kg/sq. mm Vickers, preferably between 80 and 120 kg/sq. mm Vickers. This lining 4 which represents a softer layer consists of silver and improves the "running-in" properties besides lengthening the life of the bearing. For this purpose a silver layer is selected which is free from hardening additives, for instance free from antimony, and which is deposited from a silver bath containing cyanide potassium hydroxide.

The outer supporting shell 2 may be made of a substance selected from the group consisting predominantly of chromium, nickel, copper, tin and an alloy containing at least one of the metals chromium and nickel and having a hardness in excess of 600 kg/sq. mm Vickers. Such alloys may e.g. be:

(a) A chromium-iron alloy having from 10 to 20% by weight of iron and the remainder chromium.

(b) A chromium-tungsten alloy having from 30 to 40% by weight of tungsten and the remainder chromium.

(c) A nickel-chromium alloy having from 0.1–5% by weight of chromium and the remainder nickel.

(d) A tin nickel alloy having from 10 to 70% by weight of tin and the remainder nickel.

(e) A nickel-aluminum oxide alloy having from 0.1–10% by volume of $Al_2O_3$ and the remainder nickel.

(f) A nickel silicon carbide alloy having from 1–50% by volume of silicon carbide and the remainder nickel.

(g) A bronze having approximately 9% of aluminum and the remainder copper.

It is, of course, to be understood that the above alloys may have minor negligible impurities.

The backing bearing layer 3 which is applied to the supporting shell 2, should be of a material which has a hardness in excess of 600 kg/sq. mm Vickers preferably between 800 and 1000 kg/sq. mm Vickers, when a single phase smooth hard layer is involved. When a multiphase layer is involved, the hardest phase has a hardness in excess of 1000 kg/sq. mm Vickers. To this end, a nickel-tin layer is electro-deposited onto the interior of the supporting shell 2. Preferably, a large number of blanks for the points of ball point pen refills are treated in this way simultaneously. According to a first embodiment of such a treatment, they are inserted from below into the upper part 104 (FIG. 2) of a holder H. The individual holes in the upper part 104 of the holder H for the reception of the points 101 are fitted with a sealing ring 105. This upper part 104 contains a heating chamber 106 through which all the inserted points 101 pass. The heating chamber 106 is connected by two pipes 107, 108 to a heat source, preferably a source of hot steam.

Figure 2:
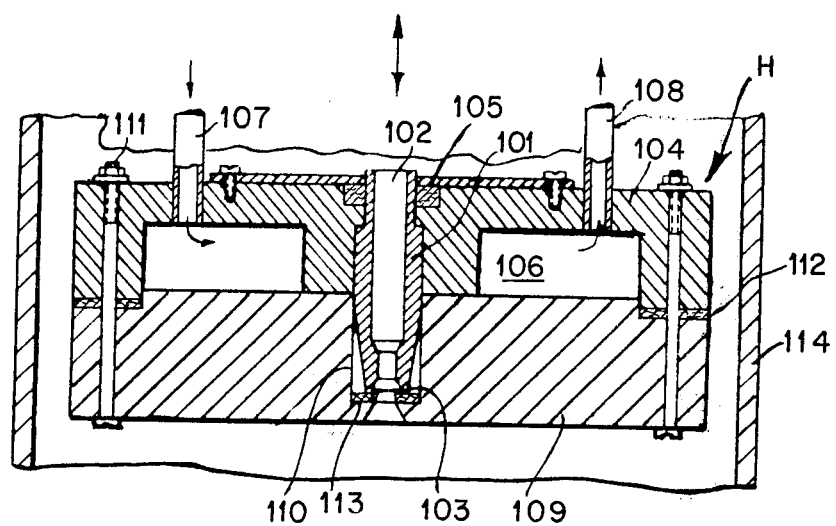
FIG. 2 illustrates a diagrammatic section through a holder for use in connection with the present invention.

The holder H also has a bottom part 109 which for each point 101 contains a separate bore 110 and by means of screw bolts 111 is now attached to the upper part 104. Between the marginal bottom surfaces of upper part 104 and the adjacent top areas of the bottom part 109 a seal 112 is provided. Each bore 110 is open at its bottom end which has a reduced diameter. This bottom end may also be a converging cone. The stepped surface at the bottom of bore 110 has mounted thereon an annular seal 113 which preferably engages not only point 101 but preferably extends radially therebeyond as shown in FIG. 2. The seals 105, 112, and 113 will assure that the insert formed by the upper and lower parts 104 and 109 can be immersed in a bath without causing the exteriors of the points to be wetted.

For performing the electro-deposition, the assembly is suspended in a bath and vertically moved up and down, preferably in the axial direction of the points.

The finished ball point, into which the ball 1 has been inserted can finally be subjected to a plating treatment in vacuo or in a protective, i.e. inert atmosphere. This post-plating treatment consists of a heat treatment for approximately an hour in a vacuum or in an inert atmosphere at a temperature of from 200 to 500° centigrade, preferably at a temperature of from 250°–300° centigrade. The thermal treatment improves the bond between the several layers by fusion. The properties of the bearing may thus be further improved. However, when the ball 1 is located by pinching the edges of the shells, allowance must be made for the heat expansion caused by the thermal treatment. The ball 1 must therefore be inserted prior to the heat treatment with a slightly greater clearance.

As to the material for the support or carrier shell 2, this material consists approximately of 9% aluminum with a predominance of bronze. Thus the by far major component of the shell 2 material is copper.

Figure 3:
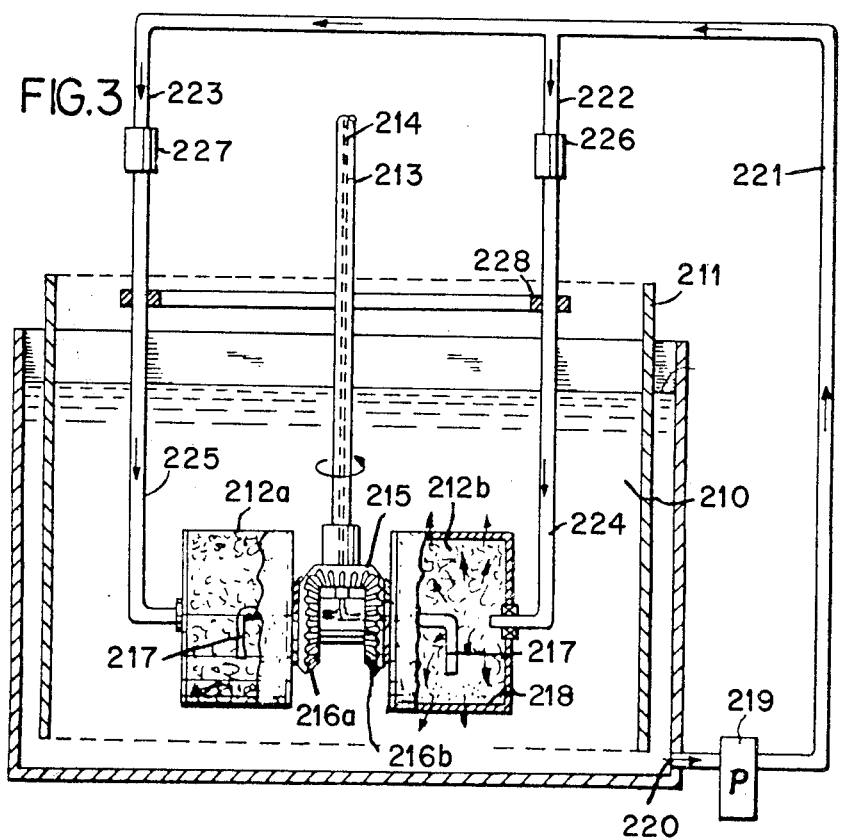
FIG. 3 is a diagrammatic illustration of a system including schematic representation of apparatus used in connection with the manufacture of the point according to FIG. 1.

There will now be described an example for the manufacture of ball sockets for writing instruments according to the invention:

Referring to FIG. 3, the device illustrated therein comprises a container 210 for a bath, into which anode plates 211 are suspended in annular arrangement. Provided in the container 210 are two coaxially arranged drums 212a, 212b which are rotated during the treatment by means of a drive shaft 213 adapted to be operatively connected to any suitable driving means. The drive shaft 213 is hollow and houses the cathode conductor 214. To the lower end of the drive shaft 213 there is connected a bevel gear 215 which by means of two additional bevel gears 216a and 216b drives the drums 212a and 212b respectively. The cathode conductor 214 which is stationarily arranged in the drive shaft 213 exits from shaft 213 below the gear 215, continues in the axial direction of the two drums 212 and ends in the angled off cathode arms 217 which also serve as stirring means. Accordingly, between the gears 216a and 216b there is provided a T-shaped branch-off. The connection between 214 and the cathode arms 217 may be rigid. However, it is also possible in the conductive trains 214–217 to provide contact establishing sliding contacts. The gears 216a, 216b which are fixidly connected to said drums 212a and 212b respectively rotate in opposite directions with regard to each other about the solid parts of the axially aligned and stationary sections of the cathode 214–217 which conduct the current. The stirring effect is realized by the fact that the drums 212 rotate and the arms 217 are standing still.

The drums 212a and 212b are preferably charged up to about ⅓ of their volume with raw ball pen sockets. In order to assure that the drums 212a and 212b are well washed by the electrolyte and the dispersion phase in the bath container 210, the drums 212a and 212b are surrounded by a gauze mantle 218. The circulation of the bath liquid is effected by a pump 219 which is connected to a discharge 220 of the container 210. The pump 219 conveys the bath liquid through a riser 221 and two branch conduits 222 and 223 and through two additional connecting conduits 224 and 225 to the drums 212a and 212b. The conduits 224 and 225 lead axially into the drums 212a and 212b. The discharge from the drums is effected through the gauze mantle 218 to the bath container 210.

In order to assure that the drums can be charged in as simple a manner as possible, the conduits 224 and 225 are through detachable connections 226 and 227 connected to the branch lines 222 and 223. A clamping ring 228 which is connected to the conduits 224 and 225 affords the possibility of withdrawing the drums from the bath container 210.

The sockets are made from rods or wire of Cu Zn 42 Pb in a conventional cutting operation. With respect to the subsequent deposition of the layers the opening for the ball is oversized correspondingly.

The raw ball sockets are loaded into the special drum arrangement according to FIG. 3 e.g., 2,000 pieces for each drum. Then the sockets are passed through the following baths (Intermediate rinsing baths are not specifically mentioned):

1. Degreasing with hot alkaline cleaners
2. Electrolytic cathodic cleaning
3. Etching by acid immersion
4. Nickel Strike plating bath
5. Copper plating bath, cyanidic
6. Silver strike plating bath
7. Silver plating bath with dispersed carbide, cyanidic bath or
7a. Copper plating bath with dispersed carbide, cyanidic bath
8. Identical with Bath No. 5
9. Bright copper bath, acidic
10. Identical with bath No. 6
11. Bright silver bath
12. Chromate finish bath
13. Freon dryer There now follows a heat treatment at a temperature of about 200° C. extending over a time period of substantially one hour. This heat treatment is performed in a vacuum of from $10^{-3}$ to $-4$ Torr or in an inert atmosphere e.g., a nitrogen gas, argon, or another gas. The next step is the insertion of the tungsten-carbide or sapphire ball and a rolling in of the ball.

The nickel Strike Bath No. 4, the cyanidic copper Bath No. 5 and No. 8 and the Silver Strike Bath No. 6 and 10 serve for a good adhesion between the adjacent layers.

Instead of the bright copper plating Bath No. 9, there may be used a hard gold plating bath, providing for a layer e.g. three microns thick. This intermediate layer is important for the present invention. After the heat treatment, the silver coating without dispersed phase has a hardness of 60 kg/mm² Hv. If only one layer of such silver coating of sufficient thickness is used, for instance, between 10–20 microns, then due to the silver layer the free edge of the bearing will during the rolling-on of the ball be forced forwardly, and the ball point will become unusable. If the intermediate layer, e.g., a galvanic bright nickel layer is too hard after rolling-on of the ball, the silver layer is forced rearwardly so that an uneven edge is formed and bad or poor writing properties result. It has been found that these intermediate layers should have a Vickers hardness of about 80–250 kg/mm², preferably of 100–150 kg/mm². Bath 8 may be replaced by Bath 8a. The bright silver provided for in Bath 11 serves for running-in of the ball in the bearing, for corrosion protection and also for a better appearance. The chromate finish in bath 12 protects the outer parts of the ball point against corrosion and provides for a good adhesion of the ink. The plating baths have to have a good Macro-throwing power to attain uniform layer thicknesses in the bearing. Tests have proved that the finished ball points of the invention show good writing properties over the entire writing length of about 10,000 m, uniform ink consumption, no double-line writing, pleasant writing "touch", no tendency to blotch or smudge and an extremely low wear of about 5 microns over the entire writing length.

Vickers hardness pertains solely to the dispersed material at respective locations, not, however, to the considerably softer matrix. There will now be set forth a more detailed representation of the baths 1–13:

Bath 1
Alkaline Precleaning after cleaning in vapor degreaser with a chlorinated solvent

| | |
|---|---|
| Mild soap chips | 6 g per liter |
| Trisodium phosphate ($Na_3PO_4 \cdot 12 H_2O$) | 6 g per liter |
| Sodium carbonate ($Na_2CO_3$) | 38 g per liter |
| Temperature | 60° C. |
| Time | 5 min. |
| pH value | 11 – 13 |

Bath 2
Final Electrocleaning, Cathodic

| | |
|---|---|
| Sodium carbonate ($Na_2CO_3$) | 50 g per liter |
| Trisodium phosphate ($Na_3PO_4 \cdot 12 H_2O$) | 25 g per liter |
| Sodium cyanide (NaCN) | 5 g per liter |
| Electrodes: stainless steel ASA 304 | |
| Temperature: | 40° C. |
| Voltage: | 9–10 V |

-continued

| Bath 2 Final Electrocleaning, Cathodic | |
|---|---|
| Cathodic: | 4 min. |
| pH value | 11 – 13 |

| Bath 3 Etching by Acid Immersion | |
|---|---|
| Hydrochloric acid HCl (31% by weight) | 300 ml per liter |
| Hydrofluoric acid HF (48–51% by weight) | 20 ml per liter |
| Temperature: | room |
| Time: | 2 min. |
| pH value | 0 – 1 |

| Bath 4 Nickel Strike (Nickel Anschlag) | |
|---|---|
| Nickel chloride $NiCl_2 \times 6 H_2O$ | 250 g per liter |
| Hydrochloric acid (31% by weight) | 150 g per liter |
| Electrodes: | nickel |
| Temperature: | room |
| Time: | 5 min. |
| Current density (cathodic) | 0.25 – 0.5 amp per sq dm |
| Voltage: | 4–5 V |
| Thickness of deposit approx. | $0.1 \cdot 10^{-6}$ m |
| pH value | 0 – 1 |

| Bath 5 Copper-Plating, cyanidic | |
|---|---|
| Sodium copper cyanide $Cu(CN)_3 Na_2$ | 100 g per liter |
| Sodium cyanide Na CN (determined by analysis) | 12 g per liter |
| Sodium carbonate $Na_2CO_3 \cdot H_2O$ | 30 g per liter |
| Potassium hydroxide KOH | 12 g per liter |
| Potassium Sodium Tartrate Na K $C_4H_4O_6 \cdot H_2O$ | 60 g per liter |
| Alkylphenolpolyglycolether | 0.5 g per liter |
| Electrodes | Electrolytic Cathode Copper |
| Temperature | 55–60° C |
| Current density (upon the entire drum content) | 0.2–0.6 amp per sq dm |
| Approx. thickness of deposit | $1 \cdot 10^{-6}$ m |
| pH value | 13 – 14 |

| Bath 6 Silver-strike | |
|---|---|
| Potassium Silver cyanide K Ag $(CN)_2$ | 1.5 g per liter |
| Potassium cyanide K CN | 25.0 g per liter |
| Potassium hydroxide KOH | 20.0 g per liter |
| Electrodes: | stainless steel |
| Temperature: | room |
| Current density | 0.04–0.1 A/dm² |
| Voltage: | 2 V |
| Approx. thickness of deposit | $0.1 \cdot 10^{-6}$ m |
| pH value | 13 – 14 |

| Bath 7 Silver-Plating-bath with dispersed Chloride | | |
|---|---|---|
| Potassium silver cyanide K Ag $(CN)_2$ | | 100 g per liter |
| Potassium cyanide KCN | | 75 g per liter |
| Potassium carbonate $K_2CO_3$ | | 40 g per liter |
| Potassium hydroxide KOH | | 20 g per liter |
| Potassium Sodium Tartrate K Na $C_4H_4O_6 \times 4H_2O$ | | 40 g per liter |
| Alkylphenolpolyglycolether | | 1 g per liter |
| Dodecyltriphenylphosphoniumbromide X $R_3P$ Br X = Dodecyl -; R = Phenyl | | 0.2 g per liter |
| Boron carbide BC | | 80 g per liter |
| Particle size | $1-5 \times 10^{-6}$ m | |
| Electrodes | Ag | |
| Temperature | 40° C | |
| Current density | cathodic | 0.6 A per sq dm |
| | anodic | 0.4 A per sq dm |
| Periodic reverse | cathodic | 2 min. |
| | anodic | 1.5 min. |
| Avg. Time to deposit | $1 \cdot 10^{-6}$ m | 20 min. |
| Thickness of deposit | $5-20 \cdot \times 10^{-6}$ m | |
| pH value | 13 – 14 | | and/or

| Bath 7a Copper-Plating, cyanidic, with dispersed Carbide | | |
|---|---|---|
| Sodium copper cyanide $Cu(CN)_3 Na_2$ | | 100 g per liter |
| Sodium cyanide Na CN (determined by analysis) | | 12 g per liter |
| Sodium carbonate $Na_2CO_3 \cdot H_2$) | | 30 g per liter |
| Potassium hydroxide KOH | | 12 g per liter |
| Potassium Sodium Tartrate Na K $C_4H_4O_6 \cdot 4H_2O$ | | 60 g per liter |
| Alkylphenolpolyglycolether | | 1 g per liter |
| pH value | | 13 – 14 |
| Dodecyltriphenylphoniumbromide X $R_3P$ Br X = Dodecyl-; R = Phenyl | | 0.2 g per liter |
| Boron carbide | BC | 80 g per liter |
| Particle size | $1-5 \times 10^{-6}$ m | |
| Electrodes | Electrolytic Cathode Copper | |
| Temperature | 55–60° C | |
| Current density | cathodic | 0.6 A per sq dm |
| | anodic | 0.3 A per sq dm |
| Periodic reverse | cathodic | 10 sec. |
| | anodic | 10 sec. |
| Avg. Time to deposit | $1 \cdot 10^{-6}$ m | 20 min. |
| Thickness of deposit | $5-20 \cdot \times 10^{-6}$ m | |

| Bath 8 Copper-Plating, cyanidic | |
|---|---|
| of the same composition as plating bath 5 | |
| pH value | 13 – 14 |

Bath 8a
Gold strike

| LEA RONAL "Aurall 292 Strike" | |
|---|---|
| Temperature: | 45° C |
| pH | 4.3–4.8 |
| Electrodes | Platinum coated Titanium |
| Voltage | 2–3 V |
| Current density | 0.02–0.1 A per sq dm |
| Avg. Time to deposit 1 micron | 15 min. |
| Thickness of deposit | 0.1–1 micron |

Bath 9
Bright copper plating, acid

| | |
|---|---|
| Copper sulfate $CuSO_4 \cdot \times 5H_2O$ | 230 g per liter |
| Sulfuric acid $H_2SO_4$(sp gr 1.83) | 56 g per liter |
| Acethyl-thio-urea $CH_3CO \cdot \times NHCSNH_2$ | 0.15 g per liter |
| Alkylbenzenesulfuric acid, sodium salt | 1 g per liter |
| Dextrin (British gum) | 2.5 g Per liter |
| Electrodes: | oxygen free copper of high conductivity OFHC-Copper |
| Temperature: | 25–30° C |
| Current density | 0.8 A per sq dm |
| Avg. Time to deposit 1 micron | 5 min. |
| Thickness of deposit | 2–4 micron |
| pH value | 0 – 1 |

Bath 10
Silver-strike

| | |
|---|---|
| of the same composition as Plating bath 6 | |
| pH value | 13 – 14 |

Bath 11
Bright Silver-Plating

| | | |
|---|---|---|
| Potassium silver cyanide K Ag (CN)$_2$ | | 100 g per liter |
| Potassium cyanide KCN | | 75 g per liter |
| Potassium carbonate K$_2$CO$_3$ | | 40 g per liter |
| Potassium hydroxide KOH | | 20 g per liter |
| Potassium Sodium Tartrate K Na C$_4$H$_4$O$_6$ × 4H$_2$O | | 40 g per liter |
| Alkylphenolpolyglycolether | | 0.5 g per liter |
| AgO-56 (Brightener, manufacturer Schering AG 1 Berlin 65 West Germany) | | 8 g per liter |
| Electrodes: | Ag | |
| Temperature: | 35–40° C | |
| Current density | cathodic | 0.6 A per sq dm |
| Avg. Time to deposit | 1 micron | 4 min. |
| Thickness of deposit | 1–4 micron | |
| pH value | 13 – 14 | |

Bath 12
Caromate Finish

| | | |
|---|---|---|
| Sodium chromate Na CrO$_4$ | | 40 g per liter |
| Potassium carbonate K$_2$CO$_3$ | | 40 g per liter |
| Sodium hydroxide Na OH | | 50 g per liter |
| Electrodes | stainless steel ASA 304 | |
| Temperature: | room | |
| Current density | 0.1 – 0.5 per sq dm | |
| pH value | 13 – 14 | |

Bath 13

Freon dryer

All salts mentioned above are dissolved in demineralized water.

During the whole process the drums are rotating slowly within the plating baths. The electrolytes of such baths are continuously circulated by means of pump 219.

As to the effect resulting from the continuous or progressive pole change from cathodic to anodic, there may be mentioned that a uniform layer thickness is obtained, for instance in the bearing or journaling bed and on the edges, especially on the upper edge of the ball socket or holding means.

As to consideration with respect to which basis can be taken to determine the preference of bath 7 or 7a, there is noted that in the dispersion baths the silver or copper, respectively, forms the matrix in which the extremely hard boron carbide phase is embedded. Important factors for this matrix material are among others good strength or stability characteristics with changing load, high heat conducting capability and low module of elasticity. These values are similar with copper and silver and also the results are nearly equal with both baths also in the writing test. Because of the price and because of somewhat higher hardness of the copper, copper is preferred for this layer. For the layer 4 of the socket, there is preferred the silver bath 11 over the bath 9 because of the higher corrosion resistance of the silver and the slide characteristics thereof which result in a more pleasant "touch" during writing.

As will also be appreciated, the respective liquid tank content in which the drums are located represents the electrolyte which by means of pump 19 is pumped through the drums.

It is, of course, to be understood that the present invention is, by no means, limited to the specific showing in the drawings, but also comprises any modifications within the scope of the appended claims.

What I claim is:

1. In a method of treating a ball point refill having a multi-layer bearing socket with an outer supporting shell comprising a substance selected from the group consisting of chromium, nickel, copper, tin and an alloy containing at least one of said metals and a ball arranged inside said outer supporting shell, said socket including a bearing structure comprising a backing layer having a hardness exceeding 800 kg/sq. mm Vickers disposed inside said outer supporting shell, and an inner lining in the form of a soft silver film adjacent to and facing said ball and having a hardness of less than 200 kg/sq. mm Vickers, which includes the improvement of forming said backing shell by electrolytically treating said socket structure in a silver plating bath containing particles of boron carbide or silicon carbide dispersed therein alternately with a cathodic current and with an anodic current to deposit said backing shell and subjecting the completed socket structure to a heat treatment in vacuum or in a protective inert atmosphere at a temperature within the range of from 200° C. to 500 ° C. for a period of from 20 minutes to 3 hours.

2. A method according to claim 1, in which the thickness of the deposited layer is from 5 to 50 microns.

3. A method according to claim 1, in which the density of the cathodic current is from 0.6 to 8 Amp./dm$^2$, and in which the density of the anodic current is from 0.4 to 6 Amp./dm$^2$.

4. A method according to claim 1, in which said electrolytic treatment step includes the employment of a dispersion bath having a proportion of dispersion material of 10–30 volume percent.

5. A method according to claim 1, in which the change-over from cathodic to anodic pulses and from anodic to cathodic pulses is effected at a frequency of less than 0.5/min. so that no pulse exceeds one minute.

* * * * *